(12) United States Patent
Jacob et al.

(10) Patent No.: US 7,803,875 B2
(45) Date of Patent: Sep. 28, 2010

(54) CURING OF RUBBERS AND THERMOPLASTIC VULCANIZATES IN THE ABSENCE OF HALOGEN DONORS

(75) Inventors: Sunny Jacob, Seabrook, TX (US); Rodney May, Wadsworth, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/823,250

(22) Filed: Jun. 27, 2007

(65) Prior Publication Data

US 2009/0005509 A1 Jan. 1, 2009

(51) Int. Cl.
*C08L 61/10* (2006.01)
*C08L 9/00* (2006.01)

(52) U.S. Cl. .................. 525/141; 525/139; 528/486

(58) Field of Classification Search .......... 525/139, 525/141
See application file for complete search history.

(56) References Cited

U.S. PATENT DOCUMENTS

| | | | | |
|---|---|---|---|---|
| 3,752,780 | A | * | 8/1973 | Paterson et al. ............ 528/159 |
| 3,878,150 | A | * | 4/1975 | Lohr et al. .................. 524/291 |
| 4,707,519 | A | | 11/1987 | Forti et al. |
| 4,748,259 | A | * | 5/1988 | Nachbur ..................... 556/132 |
| 4,835,204 | A | | 5/1989 | Carfagnini |
| 5,196,464 | A | | 3/1993 | Shinoda et al. |
| 5,457,159 | A | | 10/1995 | Fassina et al. |
| 5,621,045 | A | * | 4/1997 | Patel et al. .................. 525/237 |
| 5,952,425 | A | | 9/1999 | Medsker et al. |
| 6,143,828 | A | | 11/2000 | Chee et al. |
| 6,437,030 | B1 | | 8/2002 | Coran et al. |
| 7,319,121 | B2 | * | 1/2008 | Jacob ......................... 525/93 |
| 2004/0138076 | A1 | * | 7/2004 | Muir et al. .................. 508/460 |
| 2005/0277738 | A1 | * | 12/2005 | Hoyweghen et al. ........ 525/191 |
| 2006/0229414 | A1 | | 10/2006 | Nanba et al. |
| 2006/0293454 | A1 | * | 12/2006 | Nadella et al. .............. 525/191 |
| 2007/0129493 | A1 | | 6/2007 | Sahnoune et al. |

FOREIGN PATENT DOCUMENTS

| | | |
|---|---|---|
| EP | 1 433 812 | 9/1983 |
| EP | 0230212 | 7/1987 |
| EP | 0513699 | 5/1992 |
| EP | 1358915 | 11/2003 |
| EP | 1655331 | 5/2006 |
| WO | 2005/017011 | 2/2005 |

OTHER PUBLICATIONS

SI Group Technical Data. Image Developers: HRJ-14508. Schenectady International Inc. Apr. 1, 2007. Availble from the Wayback Machine Internet Archive. Available at http://web.archive.org/web/20070819225954/www.siigroup.com/productinfo.asp-?product=129.*

* cited by examiner

*Primary Examiner*—Randy Gulakowski
*Assistant Examiner*—Mike Dollinger

(57) ABSTRACT

Aspects of the invention include a method of curing a rubber composition comprising providing a rubber; intimately contacting a curative agent with the rubber; wherein the curative agent consists essentially of a phenol formaldehyde resin, a metal oxide and a carboxylic acid metal salt. Another aspect of the present invention is to a method of curing a rubber composition comprising providing a rubber; intimately contacting a curative agent with the rubber; wherein the curative agent comprises a phenol formaldehyde resin and carboxylic acid metal salt; and wherein halogen-donating species are absent from the rubber and curative agent.

1 Claim, No Drawings

CURING OF RUBBERS AND THERMOPLASTIC VULCANIZATES IN THE ABSENCE OF HALOGEN DONORS

FIELD OF THE INVENTION

The present invention relates in general to the curing of rubbers, and more particularly to the use of phenol formaldehyde resins in the rubber curing process such that halogen donors are excluded.

BACKGROUND

The use of phenol formaldehyde type resins for curing rubbers is well known in the art. Typically, a metal oxide and metal salt—in particular, a metal halide—is used as an activator for the resin curative. There have been various attempts to modify this cure system in order to improve performance of the resulting rubber or rubber composition. For example, U.S. Pat. No. 4,707,519 discloses the use of a phenolic resin with p-toluenesulfonic acid as an activator. U.S. Pat. No. 4,835, 204 discloses the use of salicylic acid as an activator with phenolic resins in forming thermoplastic vulcanizates (cured rubber/thermoplastic blend). U.S. Pat. No. 5,196,462 discloses the use of zinc-mercapto compounds as activators with phenolic resins. U.S. Pat. No. 5,457,159 uses sodium bisulphite as an activator with phenolic reins. U.S. Pat. No. 5,952, 425 uses phenolic resins having high levels of dibenzyl ether linkages relative to the more conventional phenolic resin with mostly methylene linkages, which were found to be more active as curing agents. U.S. Pat. No. 6,143,828 discloses that phenolic resins with only a metal oxide can achieve a partial cure state in rubber/thermoplastic TPEs. U.S. Pat. No. 6,437, 030 discloses a phenolic resin as a curative with a metal halide and metal carboxylate compound. Finally, EP 1 433 812 A discloses the use of boranes and metal oxides with phenolic resins to form partially cured TPVs.

What is needed is a curative that uses the well known phenolic resins while achieving a high level of cure. Also, the presence of halogen salts in the rubber makes the composition hygroscopic, thus necessitating the need to dry the rubber at some stage before it is used. The present invention solves these and other problems.

SUMMARY

One aspect of the present invention is to a method of curing a rubber composition comprising: providing a rubber; intimately contacting a curative agent with the rubber; wherein the curative agent consists essentially of a phenol formaldehyde resin, a metal oxide and a carboxylic acid metal salt.

Another aspect of the present invention is to a method of curing a rubber composition comprising: providing a rubber; intimately contacting a curative agent with the rubber; wherein the curative agent comprises a phenol formaldehyde resin and carboxylic acid metal salt; and wherein halogen-donating species are absent from the rubber and curative agent.

These and other aspects of the invention are described in further details herein.

DETAILED DESCRIPTION

Embodiments of the present invention are directed towards a phenol formaldehyde resin curative system for curable rubbers that excludes the need for halogen donating species such as metal halides and halogenated organic compounds that provide halogen ions or atoms. One aspect of the present invention is directed to a method of curing a rubber composition comprising providing a rubber; and intimately contacting a curative agent with the rubber, wherein the curative agent consists essentially of a phenol formaldehyde resin, a metal oxide and a carboxylic acid metal salt. Another aspect of the present invention is directed to a method of curing a rubber composition comprising providing a rubber and intimately contacting a curative agent with the rubber, wherein the curative agent comprises a phenol formaldehyde resin and carboxylic acid metal salt, and wherein halogen-donating species are absent from the rubber and curative agent.

By "halogen donating species", what is meant is any chemical compound that is capable of providing at least one halogen group as is commonly known in the chemical arts such as by elimination reactions or substitution reactions. In one embodiment, the halogen-donating species is selected from the group consisting of Group 1 to Group 14 metal halides, halogenated paraffin, halogenated polyolefins, halosulfonated polyolefins, polyhalobutadiene, and mixtures thereof.

By "intimately" mixing, what is meant is that the rubber composition and curative agent are blended by any suitable means as is know in the art such as by melt blending, shear blending and other means common in the art carried out using extruders and blenders. Intimate mixing takes place, for example, during "dynamic vulcanization" of a rubber and thermoplastic, described further below. The intimate mixing and curing of rubbers is also discussed in "The Compounding and Vulcanization of Rubber" by H. L. Stephens in RUBBER TECHNOLOGY 20-58 (Chapman & Hall 1995).

By "rubber composition", what is meant is a composition comprising at least one type of rubber in one embodiment, two or more types of rubber in another embodiment, and optionally other components such as a thermoplastic or two or more thermoplastics, oil filler, and/or other additives that are well know in the art.

By "carboxylic acid metal salt", what is meant is a chemical compound as is known in the art that includes a carboxylic acid moiety and a cationic metal moiety. Examples of a carboxylic acid include acetic acid and salicylic acid, and examples of a metal include $Ca^{2+}$ and $Zn^{2+}$. In one embodiment, the metal salt of the carboxylic acid comprises a cationic metal species derived from Groups 1 to 12 of the Periodic Table. In another embodiment, the cationic metal species is derived from Groups 3 to 12 of the Periodic Table. In yet another embodiment, the cationic metal species is derived from zinc. In yet another embodiment, the "carboxylic acid" is selected from the group consisting of C2 to C20 carboxylic acids and substituted versions thereof. In another embodiment, the carboxylic acid is selected from the group consisting of C4 to C20 hydroxy-carboxylic acids and substituted versions thereof. And in another embodiment, the carboxylic acid is selected from the group consisting of C4 to C10 hydroxy-carboxylic acids and substituted versions thereof. And in yet another embodiment, the carboxylic acid is selected from the group consisting of salicylic acid and substituted versions thereof.

By "hydroxy-carboxylic acid" what is meant is a chemical compound that includes at least one hydroxyl group and at least one carboxylic acid group, and in a preferred embodiment, these groups are situated on the chemical compound such that they can both participate in bonding relationships with the same metal ion.

In a particular embodiment, the carboxylic acid is a "styrenated" or "alkylphenolated" salicylic acid. For example, styrenated salicylic acids have the following formula (1):

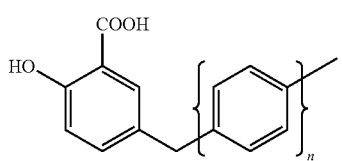

wherein n can be any number from 1 to 10, preferably n is 2 to 6.

Alkylphenolated salicylic acids have the following formula (2):

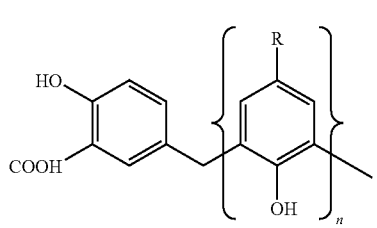

wherein n can be any number from 1 to 10, preferably n is 2 to 6. Alternatively, the linkages between alkylphenol groups can be ether linkages, or alternate between ether and alkyl linkages.

By "substituted versions thereof" as used throughout this specification, what is meant is that the moiety being referred to may have other substituents including, but not limited to, amines, amides, carboxylates, halogens (F, Cl, Br, I), sulfates, sulfonates, silanes, hydroxyl group, ether moieties and cynates.

Phenol formaldehyde resins are used as a curative in the present invention. In one embodiment, only one type of phenol formaldehyde resin is used, in another embodiment a mixture of two or more types of phenyl formaldehyde resins is sued. In one embodiment, the phenol formaldehyde resin is selected from the group consisting of structures (3):

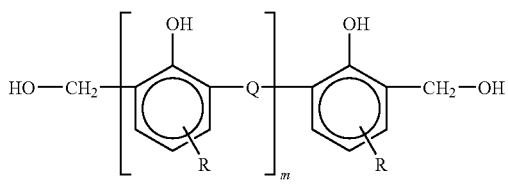

wherein m ranges from 1 to 50, more preferably from 2 to 10;

R is selected from the group consisting of hydrogen and C1 to C20 alkyls in one embodiment; and is selected from the group consisting of C4 to C14 branched alkyls in a particular embodiment; and Q is a divalent radical selected from the group consisting of —$CH_2$—, and —$CH_2$—O—$CH_2$—.

In certain embodiments, the phenol formaldehyde resin is halogenated, and in yet other embodiments, a mixture of halogenated and non-halogenated phenol formaldehyde resin is used. Also, the phenol formaldehyde resin may be in any form such as a solid, liquid, solution or suspension. Suitable solvents or diluents include liquid alkanes (e.g., pentane, hexane, heptane, octane, cyclohexane), toluene and other aromatic solvents, paraffinic oils, polyolefinic oils, mineral oils, or silicon oils, and blends thereof.

Another part of the curative is a metal oxide. In one embodiment the metal oxide is selected from the group consisting of Group 3 to Group 13 oxides and blends thereof. In another embodiment the metal oxide is selected from zinc oxides.

The term "rubber" broadly means any material that is considered by persons skilled in the art to be a "rubber," preferably a crosslinkable rubber (e.g., prior to curing) or crosslinked rubber (e.g., after curing). In addition to natural rubber, specific rubbers include, without limitation, any olefin-containing rubber such as ethylene-propylene copolymers ("EPM"), including particularly saturated compounds that can be vulcanized using free radical generators such as organic peroxides, as noted in U.S. Pat. No. 5,177,147, incorporated by reference in pertinent part. Other rubber components are ethylene-propylene-diene ("EPDM") rubber, or EPDM-type rubber. An EPDM-type rubber can be a terpolymer derived from the polymerization of at least two different $C_2$-$C_{10}$ monoolefin monomers, preferably $C_2$-$C_4$ monoolefin monomers, and at least one $C_5$-$C_{20}$ poly-unsaturated olefin. Those monoolefins desirably have the formula $CH_2$=CH—R where R is H or a $C_1$-$C_{12}$ alkyl. The preferred monoolefins are ethylene and propylene. Desirably the repeat units from at least two monoolefins (and preferably from ethylene and propylene) are present in the polymer in weight ratios of 15:85 to 85:15 (ethylene:propylene), but can also go as low as 3 weight percent ethylene derived units in the polymer in certain embodiments, and constitute from about 90 to about 99.6 weight percent of the polymer. The polyunsaturated olefin can be a straight chained, branched, cyclic, bridged ring, bicyclic, fused ring bicyclic compound etc., and preferably is a nonconjugated diene. Desirably, repeat units from the nonconjugated polyunsaturated olefin is from about 0.4 to about 10 weight percent of the rubber.

Another type of rubber is a styrenic block copolymer. These block copolymers include two hard blocks with a soft block positioned there between (i.e., ABA bock copolymer). In other embodiments, the block copolymer includes two soft blocks with a hard block positioned there between (i.e., BAB block copolymer). In one or more embodiments, the soft block can include a unit deriving from conjugated diene monomers and optionally vinyl aromatic monomers, or funtionalized vinyl aromatic monomers. Suitable diene monomers include 1,3-butadiene, isoprene, piperylene, phenylbutadiene, and mixtures thereof. Those units deriving from conjugated diene monomers can optionally be hydrogenated. Suitable vinyl aromatic monomers include styrene, alkyl-substituted styrenes such as paramethyl styrene, and (ortho, meta or para)-methyl styrene, or functionalized styrene as well as mixtures thereof.

Another type of rubber is butyl rubber. The term "butyl rubber" refers to a polymer that predominantly includes repeat units from isobutylene but also includes a few repeat units of a monomer that provides a site for crosslinking. Monomers providing sites for crosslinking include a polyunsaturated monomer such as a conjugated diene or divinyl benzene. Desirably, from about 90 to about 99.5 weight percent of the butyl rubber are repeat units derived from the polymerization of isobutylene, and from about 0.5 to about 10 weight percent of the repeat units are from at least one polyunsaturated monomer having from 4 to 19 carbon atoms. Preferably the polyunsaturated monomer is isoprene or divinylbenzene. The polymer may be halogenated to further enhance reactivity in crosslinking. Preferably the halogen is present in amounts from about 0.1 to about 10 weight percent, more preferably about 0.5 to about 3.0 weight percent based upon the weight of the halogenated-polymer; preferably the halogen is chlorine or bromine. The brominated copolymer of p-alkylstyrene, having from about 9 to 12 carbon atoms, and an isomonoolefin, having from 4 to 7 carbon atoms, desirably has from about 88 to about 99 weight percent isomonoolefin, more desirably from about 92 to about 98 weight percent, and from about 1 to about 12 weight percent p-alkylstyrene, more desirably from about 2 to about 8 weight percent based upon the weight of the copolymer before halogenation. Desirably the alkylstyrene is p-methylstyrene and the isomonoolefin is isobutylene. Desirably the percent bromine is from about 0.2 to about 8, more desirably from about 0.2 to about 3 weight percent based on the weight of the halogenated copolymer. The copolymer is a complementary amount, i.e., from about 92 to about 99.8, more desirably from about 97 to about 99.8 weight percent. These polymers are commercially available from Exxon Chemical Co.

EPDM, butyl and halobutyl rubbers are rubbers low in residual unsaturation and are preferred when the vulcanizate needs good thermal stability or oxidative stability. The rubbers low in residual unsaturation desirably have less than or equal to 10 weight percent repeat units having unsaturation. Desirably excluded are acrylate rubber and epichlorohydrin rubber.

Still other examples of rubbers are homopolymers of conjugated dienes having from 4 to 8 carbon atoms and rubber copolymers having at least 50 weight percent repeat units from at least one conjugated diene having from 4 to 8 carbon atoms.

Rubbers can also be natural rubbers or synthetic homo- or copolymers of at least one conjugated diene. Those rubbers are higher in unsaturation than EPDM rubber or butyl rubber. Those rubbers can optionally be partially hydrogenated to increase thermal and oxidative stability. Desirably those rubbers have at least 50 weight percent repeat units from at least one conjugated diene monomer having from 4 to 8 carbon atoms. Comonomers that may be used include vinyl aromatic monomer(s) having from 8 to 12 carbon atoms and acrylonitrile or alkyl-substituted acrylonitrile monomer(s) having from 3 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

Rubbers can also be synthetic rubber, which can be non-polar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers, as is well known to those skilled in the art.

A list of preferred rubber components includes any rubber selected from the following: ethylene-propylene rubber (EPM), ethylene-propylene-diene rubber (EPDM), natural rubber (polyisoprene), butyl rubber, halobutyl rubber, halogenated rubber copolymer of p-alkystyrene and at least one $C_4$-$C_7$ isomonoolefin, a copolymer of isobutylene and divinyl-benzene, homopolymers of a conjugated diene (preferably a $C_4$-$C_8$ conjugated diene), copolymers of at least one conjugated diene and a comonomer (preferably where the copolymer has at least 50 weight percent repeat units from at least one $C_4$-$C_8$ conjugated diene and/or the comonomer is a polar monomer, a $C_8$-$C_{12}$ vinyl aromatic monomer, an acrylonitrile monomer, a $C_3$-$C_8$ alkyl substituted acrylonitrile monomer, an unsaturated carboxylic acid monomer, an unsaturated anhydride of a dicarboxylic acid or a combination thereof), unsaturated non-polar elastomers, polybutadiene elastomer, styrene-butadiene elastomer and mixtures thereof.

In certain embodiments, the rubber composition will include at least one thermoplastic. The blend of the rubber and thermoplastic is typically referred to as a thermoplastic elastomer ("TPE"). If the blend is cured, such as by dynamic vulcanization, the resulting composition is a thermoplastic vulcanizate ("TPV").

The term "thermoplastic resin" broadly means any material that is not a "rubber" (as defined herein) and that is a polymer or polymer blend considered by persons skilled in the art as being thermoplastic in nature, e.g., a polymer that softens when exposed to heat and returns to its original condition when cooled to room temperature. The thermoplastic resins of the present invention may be selected from any of the following: crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof.

In one or more embodiments, the thermoplastic resin is preferably a polypropylene (preferably isotactic) having a melting point greater than 110° C., or 120° C., or 130° C., or 140° C., or 150° C. In certain embodiments, the thermoplastic resin may include a polypropylene polymer having a MFR of 1.0 to 30 dg/min. Alternatively, the thermoplastic component may include a "fractional" polypropylene having a melt flow rate less than 1.0 dg/min. In yet another embodiment, the thermoplastic resin further includes a first polypropylene having a melting point greater than 110° C. and a melt flow ranging from 1.0 to 30 dg/min and a second polypropylene having a melting point greater than 110° C. and a melt flow of less than 1.0 g/min.

Preferably, the polypropylene used in the first components described herein that has a melting point above 110° C. includes at least 90 wt % propylene units and is isotactic. Alternatively, instead of isotactic polypropylene, a first component of the present invention may include a syndiotactic polypropylene, which in certain cases can have a melting point above 110° C. Yet another alternative thermoplastic resin can include an atactic polypropylene. The polypropylene can either be derived exclusively from propylene monomers (i.e., having only propylene units) or be derived from mainly propylene (more than 80% propylene). As noted elsewhere herein, certain polypropylenes having a high MFR (e.g., from a low of 10, or 15, or 20 dg/min to a high of 25 or 30 dg/min) may be used. Others having a lower MFR, e.g., "fractional" polypropylenes which have an MFR less than 1.0 dg/min may also be used.

Another preferred thermoplastic resin is high-crystalline isotactic or syndiotactic polypropylene. This polypropylene generally has a density of from about 0.85 g/cm$^3$ to 0.91 g/cm$^3$, with the largely isotactic polypropylene having a density of from 0.90 g/cm$^3$ to 0.91 g/cm$^3$.

In yet another embodiment, the thermoplastic can be one or more propylene-based elastomers that are semi-crystalline and can be prepared by polymerizing propylene with primary comonomers including, but not limited to, ethylene or higher alpha-olefins in the presence of a transition metal catalyst with an activator and optional scavenger. The crystallinity of the propylene-based elastomer arises predominantly from crystallizable stereoregular propylene sequences. Comonomers or propylene insertion errors separate these sequences. While syndiotactic configuration of the propylene is possible, polymers with isotactic configurations are preferred.

In making the propylene-based elastomer, the comonomer used with propylene may be linear or branched. Linear a-olefins include, but are not limited to ethylene, and $C_4$-$C_{20}$ α-olefins such as 1-butene, 1-hexene, and 1-octene. Branched α-olefins include, but are not limited to, 4-methyl-1-pentene, 3-methyl-1-pentene, and 3,5,5-trimethyl-1-hexene. The olefin comonomer is present in the propylene-based elastomer within a range having an upper limit of 30.0 wt %, 28.0 wt %, 25.0 wt %, 15 wt %, 10 wt %, 5 wt % or 2.5 wt % and a lower limit of 0.1 wt %, 0.3 wt %, 0.5 wt %, 1.0 wt %, 1.2 wt % or 1.5 wt %, based on the total weight of the propylene-based elastomer.

The propylene-based elastomer of the invention can have a heat of fusion within the range having an upper limit of 75, 65, 55, 50, 40, 30, 25, 20, or 15 J/g and a lower limit of 0.5, 1, or 5 J/g.

The crystallinity of the propylene-based elastomer can also be expressed in terms of crystallinity percentage. The thermal energy for the highest order of polypropylene is estimated at 189 J/g. That is, 100% crystallinity is equal to 189 J/g. Therefore, according to the aforementioned heat of fusion values, the propylene-based elastomer of the invention can have a polypropylene crystallinity within the range having an upper limit of 40%, 35%, 29%, 26%, 21%, 16%, 13%, 11% or 8% and a lower limit of 0.05%, 0.5%, or 2.5%. The propylene-based elastomer preferably has a single broad melting transition. Typically a sample of the polymer will show secondary melting peaks adjacent to the principal peak, which may be considered together as a single melting point. The highest of these peaks is considered the melting point ("$T_{max}$"). The propylene-based elastomer of the invention can have a melting point within the range having an upper limit of 105° C., 95° C., 85° C., 75° C., 65° C., or 60° C. and a lower limit of 20° C., 25° C. or 30° C. The weight average molecular weight of the propylene based elastomer can be within the range having an upper limit of 5,000,000 daltons, or 500,000 daltons and a lower limit of 10,000 daltons, or 80,000, with a MWD within the range having an upper limit of 40, 5 or 3 and a lower limit of 1.5 or 1.8.

In some embodiments, the propylene-based elastomer has a melt index (MI) of from a lower end of 0.1 dg/min, 1.0 dg/min, 1.5 dg/min, 2.5 dg/min or 5.0 dg/min to an upper end of 10 dg/min, 15 dg/min, 25 dg/min, 35 dg/min or 50 dg/min or anywhere in between (190° C., 2.16 kg). In some embodiments, the propylene-based elastomer can have a Mooney viscosity ML (1+4)@125° C. less than 100, less than 75, less than 60 or less than 30.

In one embodiment, the propylene-based elastomer of the invention comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described in WO02/083753. Typically, approximately 75% or 85% by weight of the polymer is isolated as one or two adjacent, soluble fractions with the balance of the polymer in immediately preceding or succeeding fractions. Each of these fractions has a composition (wt % ethylene content) with a difference of no greater than 20% (relative) and more preferably 10% (relative) of the average weight percent ethylene content of the polypropylene copolymer. The propylene-based elastomer has a narrow compositional distribution if it meets the fractionation test criteria outlined above.

In one embodiment, the length and distribution of stereoregular propylene sequences in the propylene-based elastomers of the invention is consistent with substantially random statistical copolymerization. It is well known that sequence length and distribution are related to the copolymerization reactivity ratios. By substantially random, it is meant a copolymer for which the product of the reactivity ratios is generally 2 or less. In stereo-block structures, the average length of polypropylene sequences is greater than that of substantially random copolymers with a similar composition.

In certain embodiments, the rubber composition includes a thermoplastic resin as part of a thermoplastic vulcanizate (TPV). The thermoplastic resin may be present in the TPV in an amount of from any of the lower limits of 5, 8, 10 or 15 phr to any of the upper limits 20, 40, or 65 phr.

In many TPV or TPE compositions, there are also other components such as additives, oils, and of course the curative agent, which includes at least the phenolic resin and a metal oxide.

The term "additive" is defined herein to include any material that may be included as a part of the TPV, but that is neither a rubber nor a thermoplastic resin. For example, any process oil, curing agent, or filler is regarded as an "additive" for purposes of this disclosure. Curative and process oils are discussed below. A non-exclusive list of additives broadly includes carbon black and other particulate fillers, silica, titanium dioxide, colored pigments, clay, zinc oxide, stearic acid, stabilizers, anti-degradants, flame retardants, processing aids, adhesives, tackifiers, plasticizers, wax, discontinuous fibers (such as cellulose fibers). Particularly when non-black fillers are used, it is desirable to include a coupling agent to compatibilize the interface between the non-black fillers and the polymers. Desirable amounts of carbon black, when present, are from about 5 to about 250 phr.

In certain embodiments, and additive oil can be added by any suitable means to the curable rubber or the curable rubber composition. The term "additive oil" is defined herein to include both "process oils" and "extender oils," and each of those terms is defined herein in accordance with the broadest definition or usage of that term in any issued patent or publication. For example, extender oils include a variety of hydrocarbon oils and also include certain plasticizers (e.g., ester plasticizers). In an illustrative TPV, an additive oil can be present in amounts from about 5 to about 300 parts by weight per 100 parts by weight of the blend of rubber and thermoplastic components. The amount of additive oil may also be expressed as from about 30 to 250 phr, and more desirably from about 70 to 200 phr. Many additive oils are derived from petroleum fractions, and have particular ASTM designations depending on whether they fall into the class of paraffinic, naphthenic, or aromatic oils. Other types of additive oils, which can be used in the TPVs herein, are alpha olefinic synthetic oils, such as liquid polybutylene, e.g., products sold under the trademark Parapol™. The type of additive oil utilized will be that customarily used in conjunction with a particular rubber component. The ordinarily skilled chemist will recognize which type of oil should be used with a particular rubber, and also be able to determine the amount (quantity) of oil. The quantity of additive oil can be based on the total rubber content, and defined as the ratio, by weight, of additive oil to total rubber in the TPV, and that amount may in certain cases be the combined amount of process oil (typically added during processing) and extender oil (typically added after processing). The ratio may range, for example, from about 0 to about 4.0/1. Other ranges, having any of the following lower and upper limits, may also be utilized in a TPV: a lower limit of 0.4/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both. Additive oils other than petroleum based oils can be used also, such as oils derived from coal tar and pine tar, as well as synthetic oils, e.g., polyolefin materials (e.g., Nexbase™, supplied by Fortum Oil N.V.). Examples of plasticizers that are often used as additive oils are organic esters and synthetic plasticizers. Certain rubber components (e.g., EPDMs, such as Vistalon™ 3666) include additive oil that is preblended before the rubber component is combined with the thermoplastic.

In one or more embodiments, the rubber is cured or crosslinked by dynamic vulcanization. The term "dynamic vulcanization" refers to a vulcanization or curing process for a rubber contained in a blend with a thermoplastic resin (e.g., thermoplastic polypropylene), wherein the rubber is crosslinked or vulcanized under conditions of high shear at a temperature above the melting point of the thermoplastic. Dynamic vulcanization can occur in the presence of the synthetic oil, or the synthetic oil can be added after dynamic vulcanization (i.e., post added), or both (i.e., some can be added prior to dynamic vulcanization and some can be added after dynamic vulcanization). In one embodiment, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates are described in U.S. Pat. Nos. 4,311,628 and 4,594,390, although methods employing low shear rates can also be used. The degree of cure can be described in terms of gel content or, conversely, extractable components. Alternatively, the degree of cure may be expressed in terms of cross-link density. All of these descriptions are well known in the art, for example, in U.S. Pat. Nos. 5,100,947 and 5,157,081.

EXAMPLES

The following general procedure was used in the preparation of the TPV blends as set forth in the examples. The compositions were prepared in a typical thermoplastic compounding batch mixing equipment, Brabender mixer, although other conventional mixing devices such as Banbury mixers, Farrel continuous mixers twin extruders, and the like are also satisfactory. The rubber, thermoplastic, ZnO, $SnCl_2$, filler and part of the oil (about 50% of the total) were charged into a Brabender heated to 180° C. and blended for about 2 minutes at 100 rpm. At the end of the 2 minute mixing, and the torque of the blend has leveled off, the phenolic cross linking agent was added and mixed for about 3 minutes, followed by the addition of the remainder of the oil and mixing was continued for additional 2 minutes. The blend was discharged at the end the last 2 minute mixing period and compression molded into plaques for testing physical properties.

Once curing was completed, the compositions were removed from the mixer, and molded and tested for their physical properties in accordance with ASTM standards. Specifically, Shore A and D hardness were determined pursuant to ASTM D-2240-91 at 23° C. by using a durometer. Ultimate tensile strength, ultimate elongation, and 100 percent modulus were determined according to ASTM D-412-92 at 23° C. by using an Instron Testing Machine. Weight gain was determined according to ASTM D-471 after 24 hours at 125° C. Tension set was determined according to ASTM D-412. Compression Set and Recovery were determined according to ASTM D-395-B for those tests run at 70° C. and 100° C. Compression set and compression recovery tests were run for 24 hours at temperatures below room temperature and for 22 hours at room temperature and above.

This method defines a test for measuring the Hunterlab L, a, b color of TPEs. Color measurement was conducted on compression molded plaques using a Hunter Tristimulus Colorimeter Model(s) D25M-9 fitted with a 1.0" diameter viewing aperture, followed the SAEJ 1545 standard as a reference for the procedure The moisture uptake of the TPV samples was tested using a Blue M electric, Humid Flow oven. The relative humidity of the chamber was set at 81% at 25° C. The TPV blend was compression molded to 2 mm plaques at 180° C., plaques were then cut into small pellets and about 10 grams of the pellets was placed in Petri dish and dried in an oven at 80° C. for 24 hrs. The mass of the sample was determined at the end the drying period (x gm). The dried pellets were placed in the controlled humidity and chamber oven for a predetermined time of about 144 hrs. At end of 144 hrs, the mass of the sample was determined again (y gm). The moisture uptake of the sample was calculated using the formula: Moisture uptake, $\% = ((y-x)/x) \cdot 100$.

It can be seen from the data that the thermoplastic vulcanizates (EPDM/PP) cured using the metal salt of a carboxylic acid—in the embodiments of the examples a zinc salt of a styrenated salicylic acid—has less moisture intake but maintains a similar cure state. Without tin chloride (C3), there is low moisture uptake, but not having the zinc carboxylic salt produced poor cure (large oil swell and poor compression set).

TABLE 1

List of components and sources

| Material | Description | Source |
|---|---|---|
| EPDM | Vistalon 3666, 46 wt % ethylene content, 4.5 wt % ENB; 52 Mooney (1 + 4) at 125° C.; 75 phr paraffinic oil extended | ExxonMobil Chemical Co. |
| polypropylene 1 | homopolypropylene, F008F, 0.8 g/ 10 min (230° C./2.16 kg, ASTM D1238) | Sunoco, Inc. |

TABLE 1-continued

List of components and sources

| Material | Description | Source |
|---|---|---|
| polypropylene 2 | homopolypropylene, F180A, 17 g/10 min (230° C./2.16 kg, ASTM D1238) | Sunoco, Inc. |
| Oligomeric phenol resin 1 | SP-1045 octylphenol curing resin | Schenectady Intl., Inc. |
| Br-phenol resin | highly brominated octylphenol curing resin | Schenectady Intl., Inc. |
| Oligomeric phenol resin 2 | SP-1056F; brominated octylphenol curing resin | Schenectady Intl., Inc. |
| ZnO | Kadox 911, French press | Zinc Corporation of America |
| SnCl$_2$ | — | Mason Corp. |
| Oil | Sunpar 150M paraffinic oil | Sunoco, Inc. |
| Zn carboxylic salt | zinc salt of styrenated salicylic acid | Schenectady, Inc |

TABLE 2

Compositions with and without the carboxylic acid metal salt: compositions

| Material | C1 | C2 | C3 | C4 | 1 | 2 | 3 | 4 |
|---|---|---|---|---|---|---|---|---|
| EPDM | 175 | 175 | 175 | 175 | 175 | 175 | 175 | 175 |
| Zn carboxylic salt | — | 2 | — | — | 2 | 2 | 2 | 2 |
| Br-phenol resin | — | — | — | — | — | — | — | 5.5 |
| Oligomeric phenol resin 1 | 5.5 | 5.5 | 5.5 | 5.5 | 5.5 | 5.5 | — | — |
| Oligomeric phenol resin 2 | — | — | — | — | — | — | 5.5 | — |
| ZnO | 2 | — | 2 | — | — | 1 | — | — |
| SnCl$_2$ | 1.26 | 1.26 | — | 1.26 | — | — | — | — |
| PP1 | 56.6 | 56.6 | 56.6 | 56.6 | 56.6 | 56.6 | 56.6 | 56.6 |
| PP2 | 6 | 6 | 6 | 6 | 6 | 6 | 6 | 6 |
| oil | 55.1 | 55.1 | 55.1 | 55.1 | 55.1 | 55.1 | 55.1 | 55.1 |
| Total phr | 301.46 | 301.46 | 300.20 | 299.46 | 300.20 | 301.20 | 300.20 | 300.20 |

TABLE 3

Compositions with and without the carboxylic acid metal salt: Test Results

| Test | C1 | C2 | C3 | C4 | 1 | 2 | 3 | 4 |
|---|---|---|---|---|---|---|---|---|
| Hardness (Shore A) | 71 | 70 | 63 | 67 | 71 | 69 | 66 | 68 |
| UTS (psi) | 887 | 907 | 685 | 762 | 898 | 961 | 733 | 866 |
| Elongation (%) | 282 | 242 | 673 | 272 | 363 | 391 | 344 | 349 |
| 100% Modulus (psi) | 486 | 521 | 271 | 436 | 447 | 442 | 389 | 431 |
| Tension set (%) | 9.00 | 8.25 | 16.00 | 8.50 | 10.00 | 9.50 | 11.75 | 10.00 |
| LCR | 97.4 | 95.1 | 124.7 | 128.2 | 110.6 | 117.5 | 109.3 | 98.8 |
| Oil swell, % (24 hrs@121° C.) | 75.79 | 72.95 | 299.69 | 123.88 | 111.61 | 119.36 | 159.85 | 127.68 |
| Compression Set, % (22 hrs @70° C.) | 27.23 | 27.62 | 58.29 | 32.33 | 31.33 | 30.09 | 39.05 | 32.74 |
| Color L | 63.21 | 35.18 | 59.35 | 39.41 | 40.29 | 51.17 | 20.01 | 11.77 |
| Color a | 1.82 | 8.04 | 0.55 | 9.43 | 9.57 | 5.14 | 3.35 | 0.75 |
| Color b | 28.86 | 17.73 | 26.6 | 23.51 | 24.22 | 25.43 | 7.32 | 0.68 |
| Moisture uptake, % (144 hr, 81% RH@25° C.) | 0.284 | 0.154 | 0.048 | 0.185 | 0.068 | 0.118 | — | — |

What is claimed is:

1. A method of curing a rubber to form a thermoplastic vulcanizate composition, the method comprising:
   (a) providing a mixture of a rubber and a thermoplastic resin, where the rubber is an ethylene-propylene-diene rubber having an ethylene content of 46 wt. %, a 5-ethylidene-2-norbornene content of 4.5 wt. %, and a Mooney viscosity 1+4 @ 125 ° C. of about 52, and where the thermoplastic resin includes 56.6 parts by weight, per 100 parts by weight rubber, of a homopolypropylene having an MFR of 0.8 g/10 min @ 230 ° C. @ 2.16 kg load; ASTM D-1238 and 6 parts by weight, per 100 parts by weight rubber, of a homopolypropylene having an MFR of 17 g/10 min@ 230 ° C. @ 2.16 kg load; ASTM D-1238;
   (b) intimately contacting 5.5 parts by weight, per 100 parts by weight rubber, of a curative agent with the rubber;
   wherein the curative agent consists essentially of a phenol formaldehyde resin, a zinc oxide and a carboxylic acid metal salt selected from the group consisting of metal salts of styrenated and alkylphenolated salicylic acids and substituted versions thereof; and wherein halogen-donating species are absent, the halogen-donating species selected from the group consisting of Group 1 to Group 14 metal halides, halogenated paraffin, halogenated polyolefins, halosulfonated polyolefins, polyhalobutadiene, and mixtures thereof, to thereby produce a thermoplastic vulcanizate having an oil swell, determined by ASTM D-471 after 24 hours at 121° C, of less than about 160%, and a moisture uptake, after 144 hours @ 81% relative humidity @ 25° C, of less than 0.118%.

* * * * *